United States Patent
Self et al.

(10) Patent No.: US 10,989,240 B2
(45) Date of Patent: Apr. 27, 2021

(54) BED FRAME DESIGNED FOR QUICK ASSEMBLY

(71) Applicants: Larry Self, Wichita, KS (US); Rolf Gunderson, Wichita, KS (US)

(72) Inventors: Larry Self, Wichita, KS (US); Rolf Gunderson, Wichita, KS (US)

( * ) Notice: Subject to any disclaimer, the term of this patent is extended or adjusted under 35 U.S.C. 154(b) by 353 days.

(21) Appl. No.: 16/049,910

(22) Filed: Jul. 31, 2018

(65) Prior Publication Data
US 2020/0040927 A1    Feb. 6, 2020

(51) Int. Cl.
*A47C 19/00*  (2006.01)
*F16B 12/54*  (2006.01)
*A47C 19/02*  (2006.01)

(52) U.S. Cl.
CPC ............ *F16B 12/54* (2013.01); *A47C 19/005* (2013.01); *A47C 19/025* (2013.01)

(58) Field of Classification Search
CPC ..... A47C 19/00; A47C 19/005; A47C 19/025; A47C 23/00; A47C 23/14
See application file for complete search history.

(56) References Cited

U.S. PATENT DOCUMENTS

| | | |
|---|---|---|
| 1,862,463 A | 6/1932 | Breckman et al. |
| 2,222,222 A | 11/1940 | Dennis, Jr. |
| 3,105,976 A | 10/1963 | Roche |
| 3,291,079 A | 12/1966 | Ruda |
| 3,699,593 A * | 10/1972 | Oetiker ................. A61G 7/00 5/111 |
| 3,840,913 A * | 10/1974 | Feische ................. A47C 23/14 5/191 |
| 3,882,557 A | 5/1975 | Stehlik |
| 3,967,331 A | 7/1976 | Glassman |
| 4,155,131 A | 5/1979 | Harris et al. |
| 4,613,999 A | 9/1986 | Franco et al. |
| 5,155,881 A | 10/1992 | Lafferty |

(Continued)

FOREIGN PATENT DOCUMENTS

| | | |
|---|---|---|
| CN | 203802075 U | 9/2014 |
| WO | WO2016045551 A1 | 3/2016 |

OTHER PUBLICATIONS

"Alpine SNAP Bed" by Fashion Bed Group, web page, https://fashionbedgroup.com/beds/alpine-snap-bed.

(Continued)

*Primary Examiner* — Fredrick C Conley
(74) *Attorney, Agent, or Firm* — Erickson Kernell IP, LLC

(57) ABSTRACT

The present invention is directed to a bed frame designed for quick assembly. In an exemplary embodiment, the invention may comprise a wire lattice that forms the support surface for a mattress and, if necessary, box springs. The wire lattice can be secured to a perimeter frame using brackets which hook onto the lattice and also attach to the sides of the frame. The bed frame may include vertical supports or legs that can be quickly attached to the frame. Each leg may include an attachment plate and a catch extending above the attachment plate. The leg can be secured to the bed frame by sliding the attachment plate into a receiver attached to the bed frame. As the attachment plate is being inserted, the catch may engage a series of corrugations formed in the receiver. The catch may press against a corrugation to lock the leg into the receiver.

13 Claims, 6 Drawing Sheets

(56) References Cited

U.S. PATENT DOCUMENTS

| | | |
|---|---|---|
| 5,577,280 A | 11/1996 | Elliott |
| 6,419,212 B1 | 7/2002 | Arnold et al. |
| 6,721,970 B1 | 4/2004 | Cheng |
| 6,883,191 B2 | 4/2005 | Gaboury et al. |
| 7,219,378 B2 | 5/2007 | Polevoy et al. |
| 8,621,685 B2 | 1/2014 | Jin |
| 8,739,333 B2 | 6/2014 | Boyle et al. |
| 8,813,279 B2 | 8/2014 | Saunders et al. |
| 9,131,779 B2 | 9/2015 | Jin |
| 9,247,825 B2 | 2/2016 | Polevoy et al. |
| 9,526,347 B2 | 12/2016 | Boyd |
| 9,782,014 B2 | 10/2017 | Lee et al. |
| 9,907,405 B2 | 3/2018 | An |
| 2010/0005587 A1 | 1/2010 | Choi |
| 2015/0208811 A1 | 7/2015 | Polevoy et al. |
| 2017/0196364 A1 | 7/2017 | Choi |
| 2017/0202365 A1 | 7/2017 | Polevoy et al. |
| 2017/0208955 A1 | 7/2017 | Lee |
| 2017/0340129 A1 | 11/2017 | Leng |
| 2018/0055235 A1 | 3/2018 | Choi |

OTHER PUBLICATIONS

"Versaleg" by Innomax, web page, http://www.innomax.com/index2.php?crn=254.

"Quick Snap 14" Platform Bed" by Zinus, Wayfair web page, SKU ZSMT1053, https://www.wayfair.com/furniture/pdp/zinus-quick-snap-14-platform-bed-zsmt1053.html.

\* cited by examiner

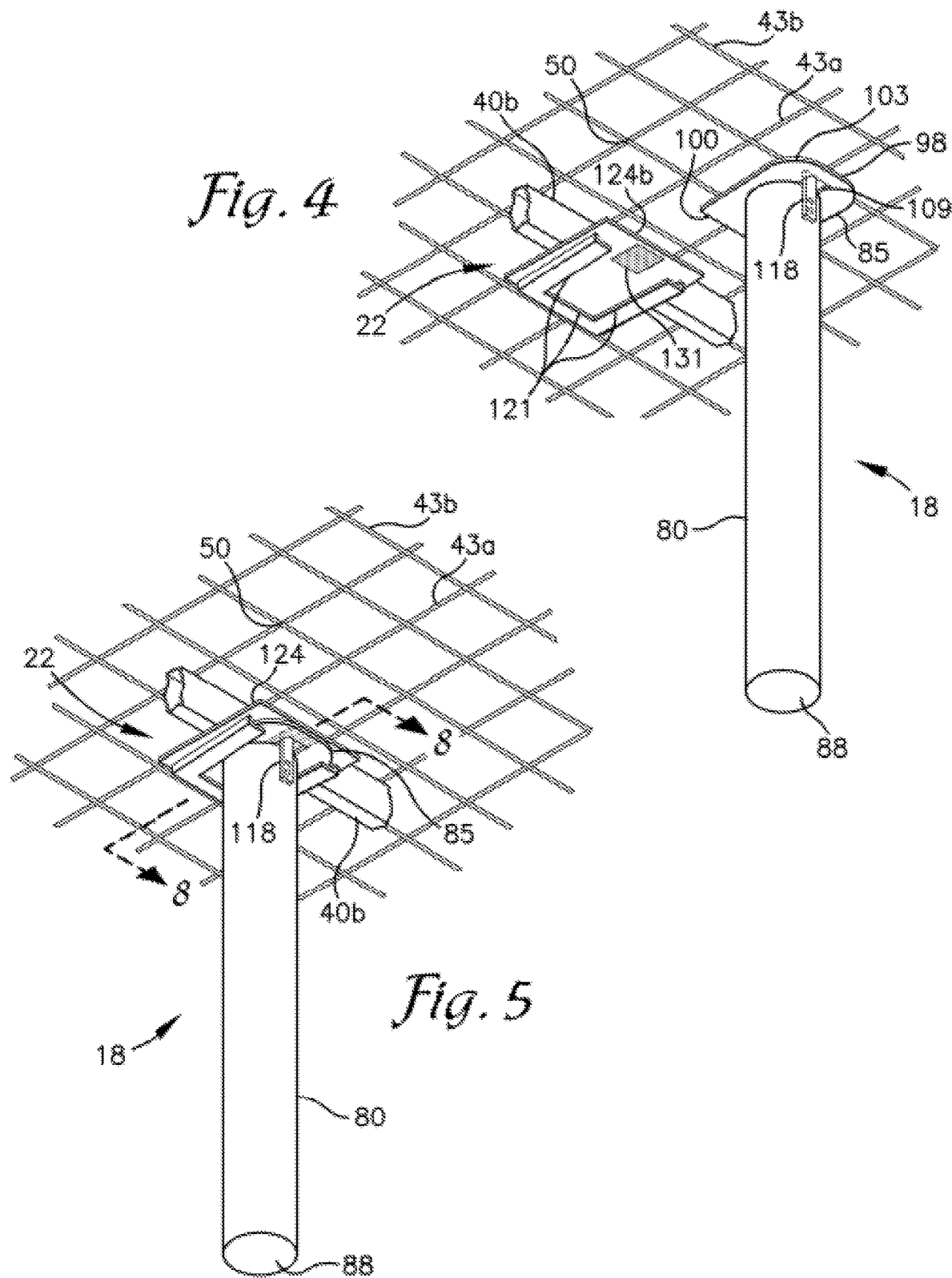

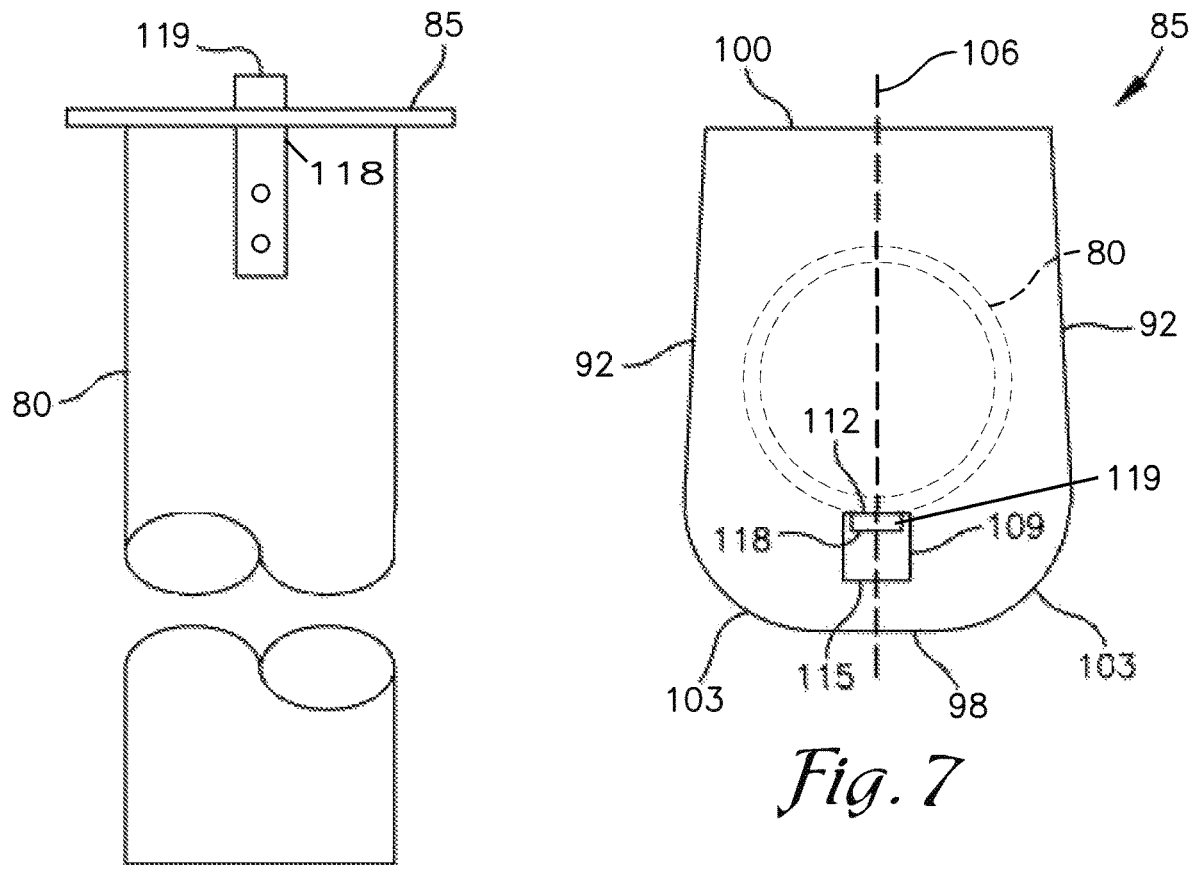
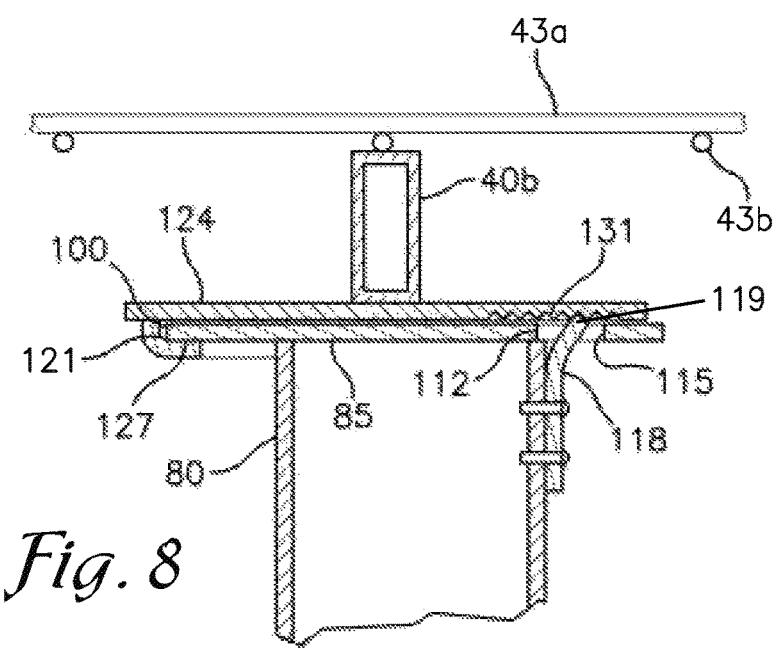

BED FRAME DESIGNED FOR QUICK ASSEMBLY

FIELD

The present invention relates generally to bed frames. More specifically, the invention relates to bed frames that can be assembled quickly using few or no tools.

BACKGROUND

A conventional bed includes a mattress resting atop a box spring, which sits on a bed frame. The bed could also have a headboard attached to one end of the frame and a footboard attached to the opposite end of the frame. A typical bed frame includes an upper section that supports a box spring and mattress and a lower section that rests on the floor. The upper section may include rails and/or slats for supporting the box spring and mattress. A conventional bed frame may have L-shaped rails arranged in a rectangular configuration with slats extending between the rails. The perimeter of a box spring can sit on the rails with the interior part of the box spring being supported by the slats. The lower section of a bed frame typically includes legs or some other type of support resting on a floor.

Bed frames are usually constructed of metal, wood, or a combination of the two. These materials tend to be heavy and a typical frame has multiple components, some of which are quite large. Assembling the components may require an assortment of hardware (e.g., nuts, bolts, and washers) and tools. Fastening together the large and heavy components can make assembly of a bed frame awkward and difficult. Assembly often requires more than one person and it can take a significant amount of time. The weight of the materials also makes shipping the bed frame from a manufacturer to a retail store or consumer expensive.

To address these problems, manufacturers have tried to make bed frames lighter and easier to assemble. For example, some frames utilize hollow (e.g., tubular) components or components made of plastic. Other bed frames have been designed to include only relatively small components so that each component is lighter and easier to handle. This has the obvious drawback that more pieces means there is a greater chance of losing a piece. Also, making bed frame components lighter does not necessarily make the frame easier to assemble. Many bed frames still require threaded fasteners to join the various components. Installing fasteners is tedious and time consuming, and keeping track of fasteners and the tools required to install fasteners can be difficult.

In certain scenarios, the speed in which a bed frame can be assembled may have a significant impact on cost. For example, when furnishing a newly built hotel, it could take 100 hours or more for a person to assemble bed frames for all of the rooms. That can translate to thousands of dollars spent on simply setting up bed frames. If assembly time can be reduced, the cost of installing the bed frames will be reduced.

At least one manufacturer has developed a bed frame designed for tool-less assembly. U.S. Pat. No. 6,883,191 discloses a bed foundation constructed of blow-molded plastic that may be assembled without the use of tools. While the bed frame in that patent may not need tools, it still requires threaded fasteners. Specifically, the patent describes using lag bolts, screws or similar devices to hold the legs to the side rails and using wing nuts to tighten such fasteners. Because threaded fasteners are required, assembly is still tedious and there is a risk that the fasteners could be lost.

Thus, there remains a need in the art for a bed frame that avoids drawbacks common to existing frames. Specifically, a bed frame is needed that is strong, durable, relatively lightweight, and can be quickly and easily assembled. The present invention addresses this need.

SUMMARY

Embodiments of the invention are defined by the claims below, not this summary. A high-level overview of various aspects of the invention is provided here to introduce a selection of concepts that are further described in the Detailed Description section below. This summary is not intended to identify key features or essential features of the claimed subject matter, nor is it intended to be used in isolation to determine the scope of the claimed subject matter.

The present invention is directed to a bed frame designed for quick assembly. The bed frame is for supporting a box spring (if necessary), a mattress, and one or more individuals. In an exemplary embodiment, the bed frame includes a perimeter frame having four sides arranged in a generally rectangular configuration and defining a generally rectangular area. One or more cross-members are attached to the perimeter frame and routed from one side of the perimeter frame to the other. On top of the cross-members is a support surface for receiving the mattress or box springs. The support surface has a size and shape that approximates the generally rectangular area defined by the perimeter frame. One type of support surface comprises a wire lattice structure. The support surface is fixedly attached to all sides of the perimeter frame at various locations by fastening or welding.

In addition to fastening or welding, the support surface is also held to the frame using brackets which hook onto the support surface and also attach to the sides of the frame. The brackets may utilize a series of extra wide hooks with notches on the bends of the hooks. If wire lattice is used, the brackets can be installed by first hooking onto a segment of wire running perpendicular to the hooks and then moving the bracket sideways until wire segments that are parallel to the hooks slide into the notches on the bends of the hooks. When installed, a portion of the support surface is covered by a portion of the bracket. Several brackets may be placed around the perimeter of the lattice and attached to the sides of the bed frame to help hold the lattice to the frame and protect people and objects from possible shape edges on the lattice.

The bed frame also includes vertical supports or legs. The legs may include an attachment plate having converging sides (which may result in a generally trapezoidal shape) mounted to the top of the leg column. There may be a catch extending upwardly from the top of the column and passing through an opening in the attachment plate. The catch can be a metal strip that extends slightly above the plate. The leg can be secured to the bed frame by sliding the attachment plate into a receiver secured to the bed frame. The receiver comprises at least two channels for receiving the sides of the attachment plate. Both the receiver and attachment plate are shaped to allow the attachment plate to be inserted into the receiver in only one orientation. As the attachment plate is being inserted, the catch is on the trailing side of the attachment plate. When the plate is most of the way into the receiver, the catch may contact the edge of the receiver and deflect downward until the end of the catch is even with or just slightly above the upper surface of the attachment plate. The catch may move over a series of corrugations in the receiver until the attachment plate is inserted completely into the receiver and the catch is pressed against one of the corrugations, which locks the leg into the receiver. At this point the leg is installed on the frame.

BRIEF DESCRIPTION OF THE DRAWINGS

FIG. 4 is an enlarged partial perspective view of an interior leg receiver and corresponding support leg for the bed frame of FIG. 1.

FIG. 5 is an enlarged partial perspective view of the support leg of FIG. 4 installed in its corresponding receiver.

FIG. 6 is a partial side view of the support leg of FIG. 4.

FIG. 7 is a top view of the support leg of FIG. 4.

FIG. 8 is a partial cross-sectional view of a support leg and receiver taken along line 8-8 of FIG. 5.

DETAILED DESCRIPTION OF EXEMPLARY EMBODIMENTS

Various embodiments of the present invention are disclosed herein, it is to be understood that the disclosed embodiments are merely exemplary of the invention, which may be embodied in various forms. Thus, any specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology used in the following description is for convenience in reference only and is not limiting. For example, the words "vertically," "horizontally," "vertical," "horizontal" and "upwardly," "downwardly," "upper," "lower" all refer to the depicted position of the element or embodiment to which the reference is made. The words "inwardly" and "outwardly" refer to directions toward and away from, respectively, the geometric center of the embodiment being designated and parts thereof. The terminology used herein may include the words specifically mentioned, derivatives thereof and words of a similar import. It is further understood that terminology such as the aforementioned directional phrases may be used to describe exemplary embodiments of the bed frame as shown in the figures herein. This is for convenience only as it is understood that the exemplary embodiments of the apparatus described may also be used in other orientations.

Figure 1:
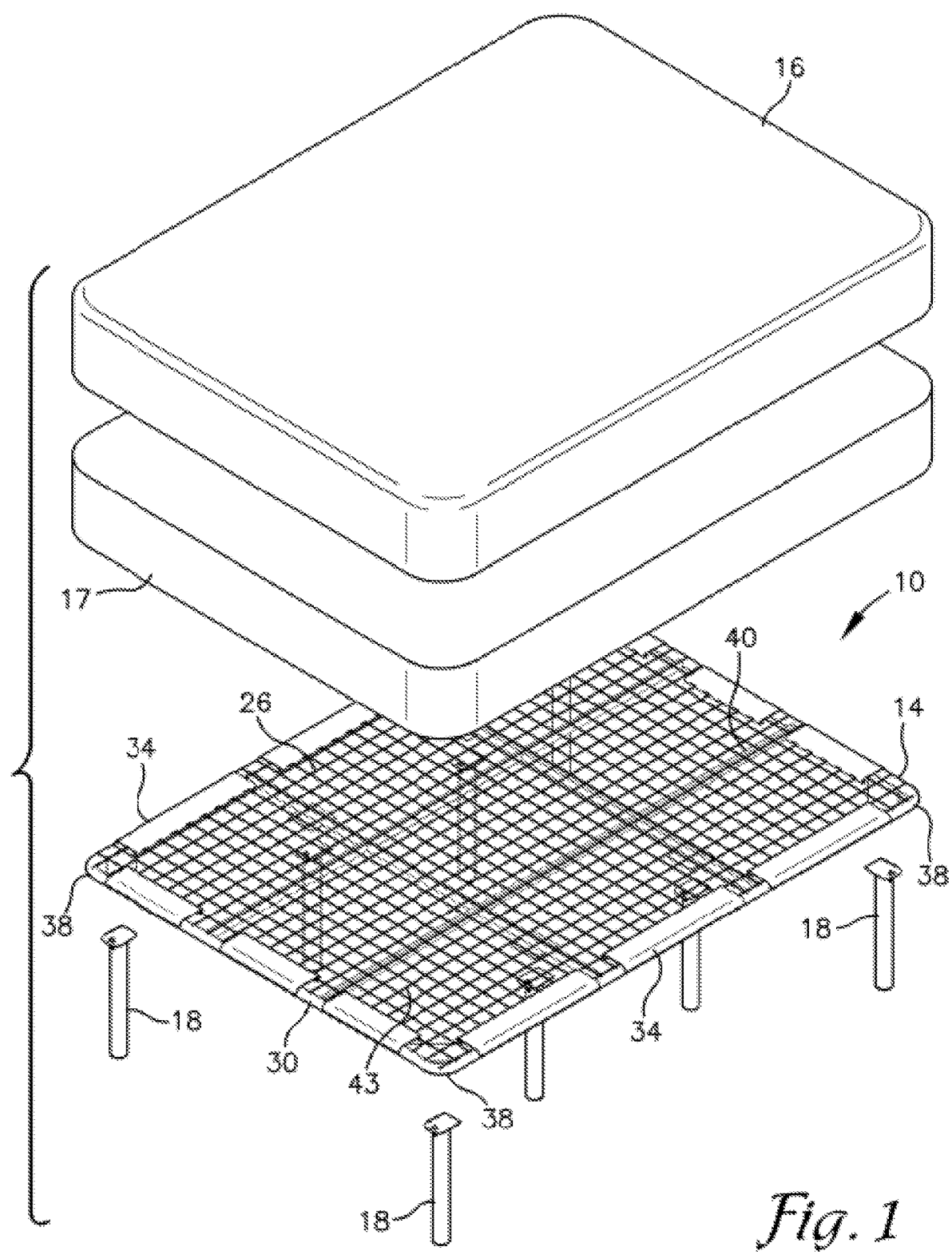
FIG. 1 is an exploded perspective view of a bed showing a first embodiment of the bed frame in accordance with the present invention.
Figure 2:
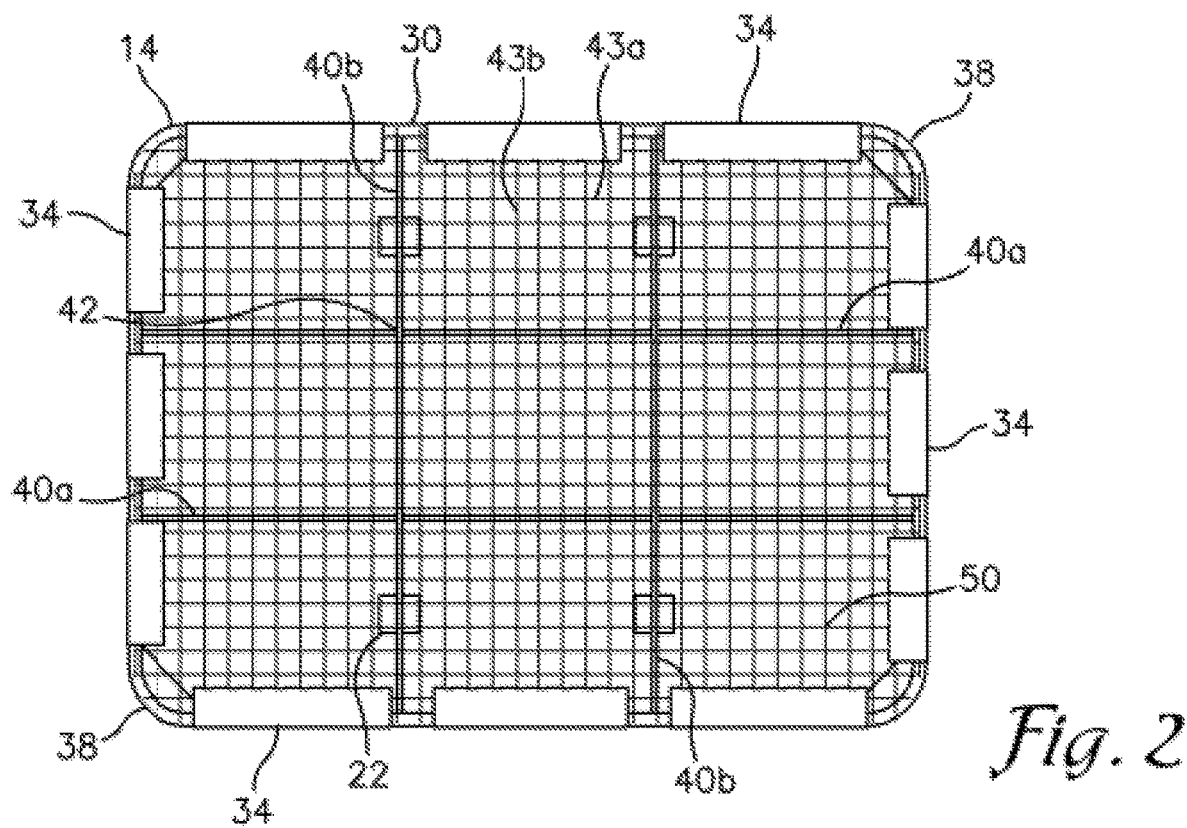
FIG. 2 is a top view of the bed frame of FIG. 1.
Figure 3:
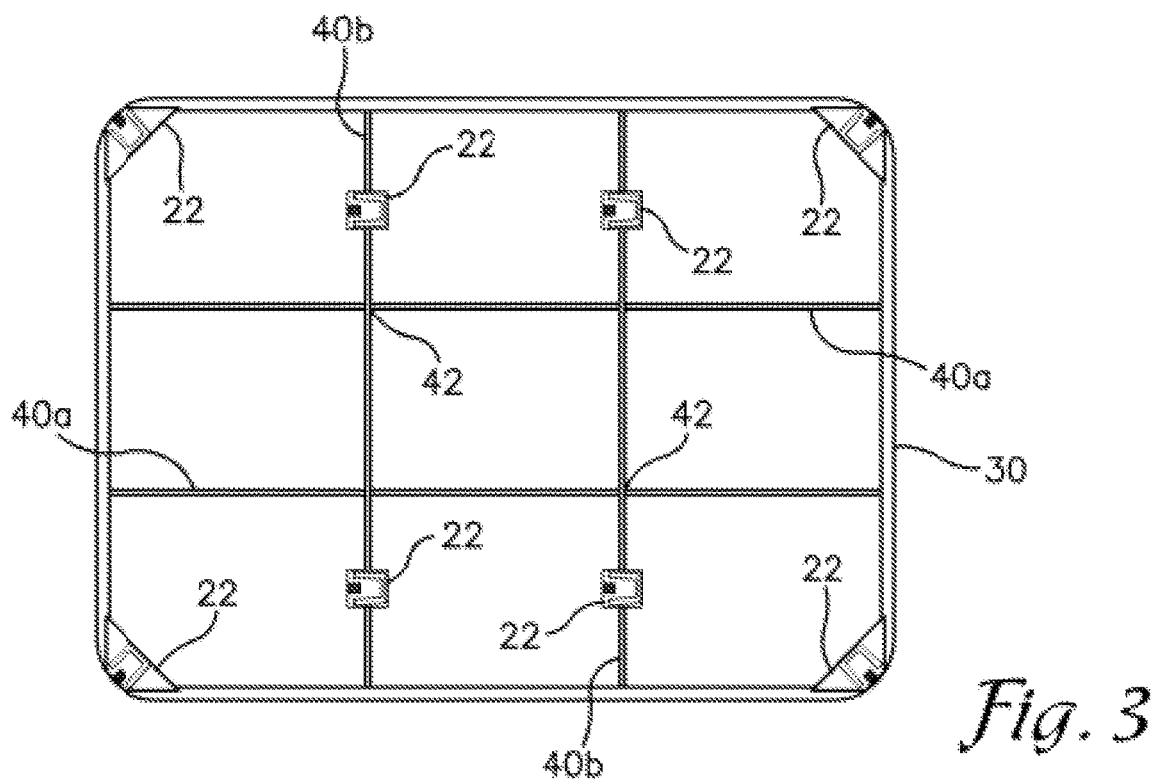
FIG. 3 is a bottom view of the bed frame of FIG. 1 without support legs, wire lattice, or lattice brackets.
Figure 9:
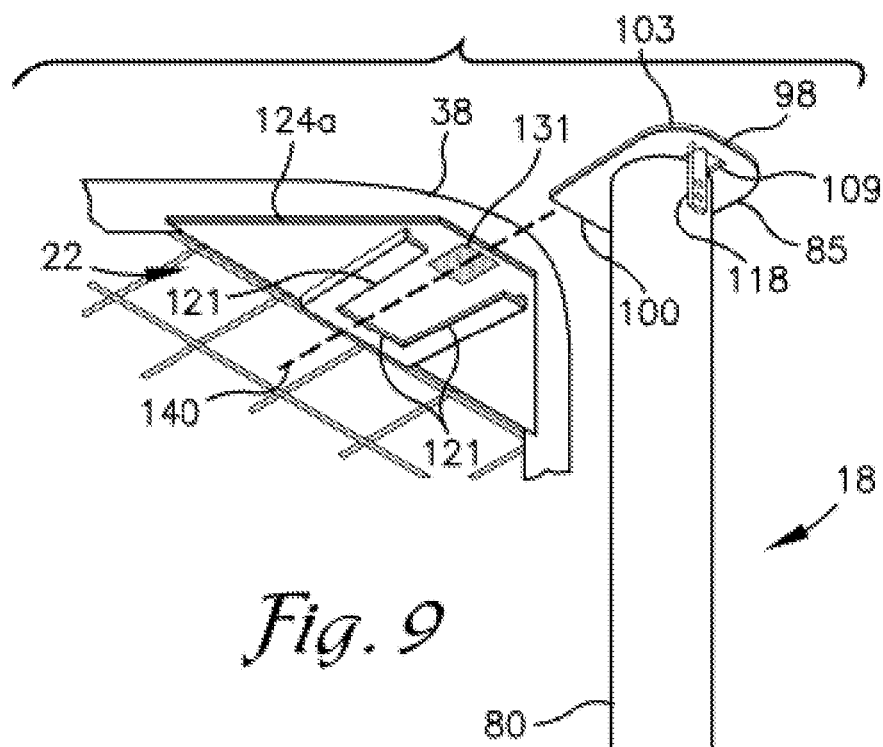
FIG. 9 is an enlarged partial perspective view of a corner leg receiver and corresponding support leg for the bed frame of FIG. 1.
Figure 10:
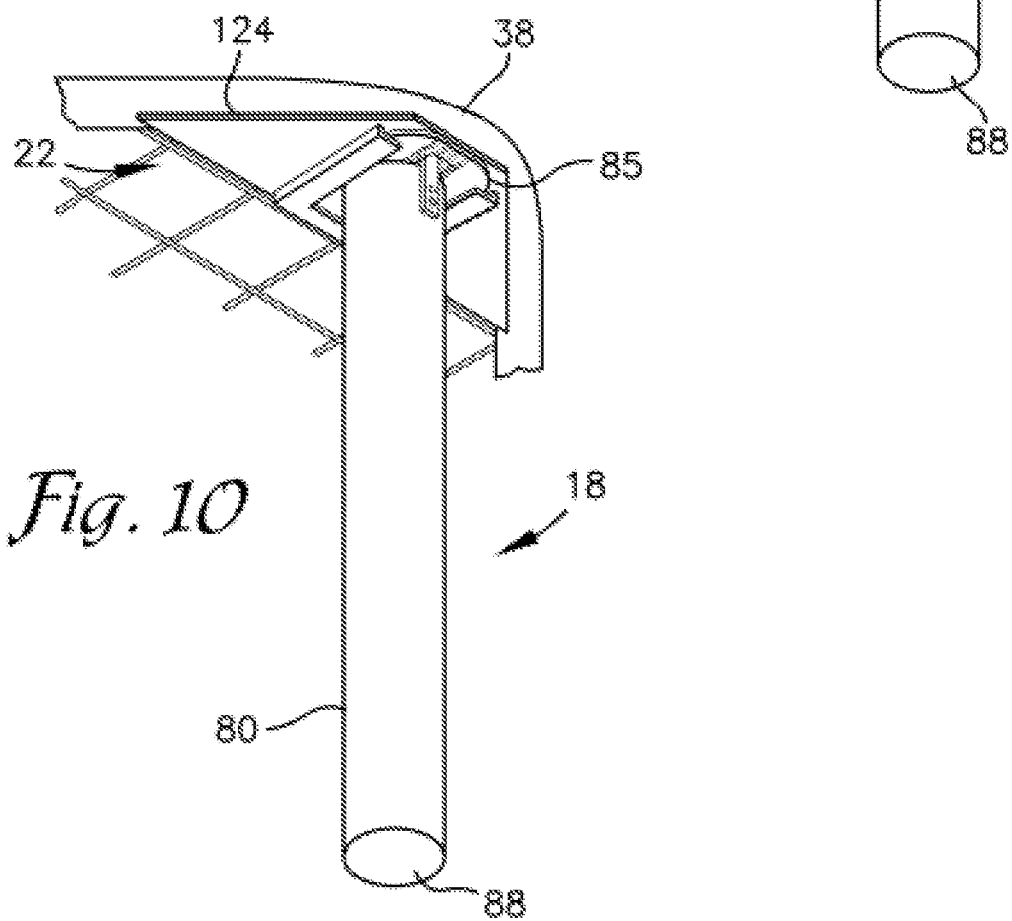
FIG. 10 is an enlarged partial perspective view of the support leg of FIG. 9 installed in its corresponding receiver.

Referring initially to FIGS. 1-3, a bed frame in accordance with an exemplary embodiment of the present invention is referenced generally by the numeral 10. The bed frame 10 comprises a support assembly 14 for supporting a mattress 16, box spring 17 (if necessary) and one or more individuals. A plurality of vertical supports or legs 18 is secured to the underside of support assembly 14. Each leg 18 engages with a leg receiver 22 attached to the underside of support assembly 14. Support assembly 14 includes a wire lattice 26 secured to a perimeter frame 30 and brackets 34 that help secure lattice 26 to the frame 30.

Figure 12:
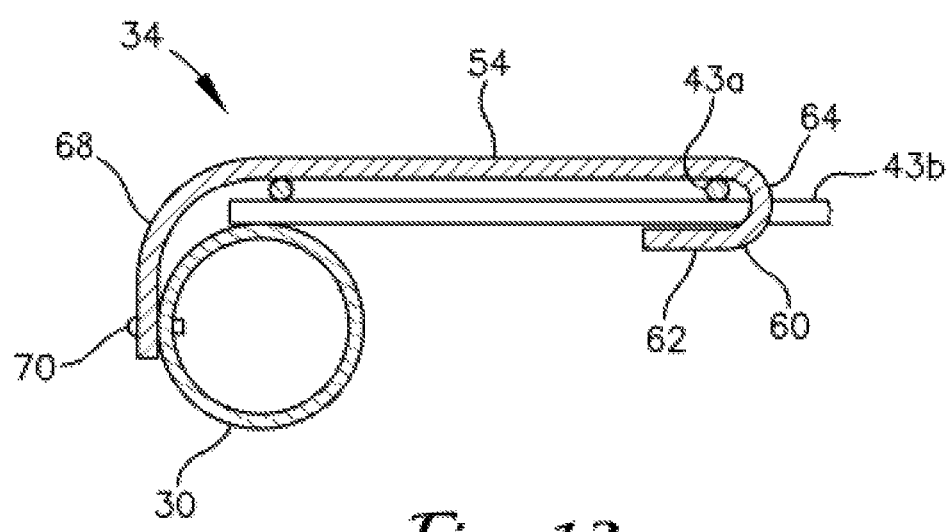
FIG. 12 is a cross-sectional view of a perimeter bracket taken along line 12-12 of FIG. 11.

As shown, the perimeter frame 30 of support assembly 14 is arranged in a generally rectangular shape that approximates the size and shape of the mattress 16 or box spring 17 being supported. The corners 38 of perimeter frame 30 may be rounded if desired to conform to the shape of the mattress 16 or box spring 17. Rounded corners 38 also minimize the potentially hazardous sharp edges of non-rounded corners. The present embodiment of bed frame 10 employs a perimeter frame 30 that is tubular, which helps to minimize weight while maintaining strength and rigidity. Accordingly, as shown in FIG. 12, frame 30 is generally hollow and may have a circular cross section. It is foreseen that other cross sectional shapes (such as rectangular) may also be used. Perimeter frame 30 may be fabricated from various materials such as steel, aluminum, plastic, or a composite material. The frame 30 may be constructed as a unitary piece or it could be segmented. If segmented, frame 30 could be constructed by joining straight and curved segments end to end to arrive at the desired shape. The segments could be joined by various methods including welding or fastening when manufactured, relying on friction (e.g., if ends are telescoped together), or some type of locking mechanism.

Support assembly 14 also includes cross-members 40, which help support the load on the support assembly 14. Each cross-member 40 runs from one side of the perimeter frame 30 to the opposite side of the frame 30. Cross-members 40 may be secured to the perimeter frame 30 by welding or mechanical fasteners when manufactured. The present embodiment has two longitudinal cross-members 40a and two transverse cross-members 40b. Cross-members 40a and 40b are approximately equally spaced along their respective sides of perimeter frame 30. The exact placement and number of cross-members 40 will depend on the size and shape of the mattress 16 and/or box spring 17 and the load being supported. To add strength and rigidity to support assembly 14, each cross-member 40 is also secured to any other cross-member 40 that it intersects. For example, at each location where a cross-member 40a intersects a cross-member 40b, the two members may be joined by a weld 42.

Support assembly 14 also includes a wire lattice 26. Lattice 26 may include a plurality of wires 43 arranged in a grid or other pattern. In the preferred embodiment, a first set of wires 43 runs in a direction parallel to a longitudinal side of perimeter frame 30 and a second set of wires 43 runs perpendicular to the first set of wires. For purposes of description, each wire in the first set will be referred to as a wire 43a and each wire in the second set will be referred to as a wire 43b. The size and spacing of wires 43a and 43b varies depending on the weight of the load being supported by bed frame 10. In the present embodiment, a wire size of 10 gauge and a spacing of approximately 3 inches is used. The wires 43 can be woven together (e.g., a wire 43a can be routed such that it alternates passing above and below each wire 43b that it intersects) or each set of wires can run in a separate plane (e.g., all wires 43a run above all wires 43b). Other variations of lattice 26 are also possible such as one wire 43a routed above a wire 43b and the adjacent wire 43a routed below a wire 43b and so on. Also, at each intersection point between the wires 43, there may be a weld or some other type of fixed connection. In the present embodiment, all of the wires 43a run above wires 43b and at any point where two wires 43 intersect they are joined by a weld 50. Wires 43 can be constructed of various materials, however steel is used in the present embodiment.

Wire lattice 26 is sized to approximate the area defined by perimeter frame 30. When installed, the periphery of lattice 26 is adjacent frame 30 on all sides, and lattice 26 may be welded or fastened to frame 30 when manufactured at various points to keep the lattice 26 from shifting. The welding or fastening of lattice 26 to perimeter frame 30 also helps transfer load on the lattice 26 to perimeter frame 30.

Brackets 34 may be used to help hold wire lattice 26 to perimeter frame 30. Brackets 34 are secured to various locations around perimeter frame 30 and they also hook onto lattice 26. Each bracket 34 comprises a rectangular plate 54 with curved or hooked extensions on opposing sides of the plate (FIG. 12). Plate 54 is sized to reach from perimeter frame 30 inward so as to cover the periphery of wire lattice 26 at certain locations. Each bracket 34 serves several purposes including holding lattice 26 in place if it is not welded or fastened to perimeter frame 30, providing additional support even if lattice 26 is welded or fastened to perimeter frame 30, and covering any possible sharp edges that may form at the periphery of lattice 26 (whether formed during manufacturing or by fatigue or failure during use of bed frame 10). Plate 54 may be made from various materials including steel, aluminum, or plastic.

Figure 11:
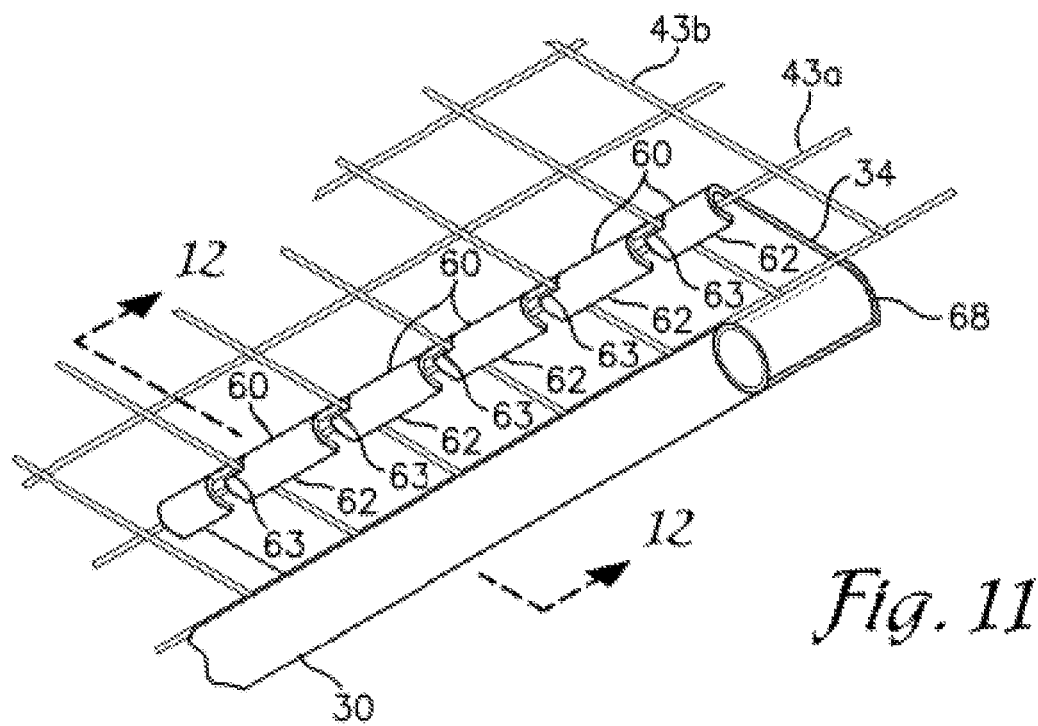
FIG. 11 is an enlarged partial perspective view of a perimeter bracket for the bed frame of FIG. 1.

Extending from a first longitudinal side of plate 54 is a plurality of hooks 60 for engaging lattice 26. As best seen on FIG. 11, hooks 60 are arranged on plate 54 such that there is one hook for each wire 43b routed under plate 54. Each hook 60 is relatively wide, with the width being slightly less that the distance between wires 43b. The space between each hook 60 is relatively narrow with the space being slightly larger than the diameter of wires 43b. Each hook 60 includes a segment turned under plate 54 to form a catch 62. The space between catch 62 and plate 54 is large enough to receive a portion of lattice 26 that includes both wires 43a and 43b. In the present embodiment, that means that the space between catch 62 and plate 54 is approximately the same distance as the combined thickness of both wires 43a and 43b (since one wire runs atop another). A notch 63 is formed on one side of hook 60 in the curved section or bend 64 of the hook. Similar to the space between catch 62 and plate 54, notch 63 approximates the cumulative thickness of both wires 43a and 43b. To install bracket 34 on lattice 26, the lattice hooks 60 are positioned to grasp a wire 43a such that the wire 43a is placed within the space between catch 62 and plate 54. The bracket 34 is then oriented such that a wire 43b is placed within each notch 63.

Referring to FIG. 12, extending from a second longitudinal side of plate 54 is a curved segment 68. Curved segment 68 extends downwardly from plate 54 and has a radius of curvature that approximates the radius of the cross-section of perimeter frame 30. Curved segment 68 extends downward a sufficient distance such that it can rest on frame 30 and extend more than halfway down the side of the frame 30. Bracket 34 is attached to perimeter frame 30 after the bracket is attached to lattice 26. To secure bracket 34 to frame 30, curved segment 68 is laid over frame 30 and threaded fasteners or rivets 70 are driven through segment 68 and into frame 30 when manufactured.

Bed frame 10 further comprises a plurality of legs 18 secured to the underside of support assembly 14. As shown in more detail on FIGS. 4-10, leg 18 includes a column 80 extending downwardly from a leg attachment plate 85. Column 80 is a generally cylindrical piece having a tubular construction. The size and shape of column 80 may vary based on the size and shape of frame 10, however in the present embodiment column 80 is approximately two inches in diameter and sixteen inches tall. Leg 18 may be fabricated from various materials such as steel, aluminum, wood or a composite material, and it is foreseen that non-cylindrical and non-tubular designs may be used. Leg 18 may also include a foot 88 in the form of a circular disc mounted to the bottom of column 80. It is foreseen that there could also be a wheel or caster attached to the leg.

Attachment plate 85 of leg 18 is defined by two converging sides 92 extending from a back edge 98 of the plate toward a front edge 100. In the present embodiment, each side 92 has an angle of approximately three degrees with respect to the longitudinal centerline 106 of attachment plate 85. Front edge 100 and back edge 98 are generally parallel and serve as the leading and trailing sides, respectively, of plate 85. Back edge 98 may include rounded corners 103 or the edge 98 may be completely rounded if desired. Attachment plate 85 may be secured to the top of column 80 using various techniques including welding when manufactured.

Attachment plate 85 includes an aperture 109 formed in the plate between back edge 98 and column 80. More specifically, aperture 109 is generally rectangular with a first side 112 aligned with the outer surface of column 80 when attachment plate 85 is secured to column 80. Aperture 109 extends approximately one half inch from first side 112 to a generally parallel second side 115. Aperture 109 is located on attachment plate 85 such that centerline 106 runs through the approximate midpoints of first and second sides 112 and 115.

A catch 118 is attached to the upper portion of column 80 and extends upwardly through aperture 109. Catch 118 is a strip of material (such as steel, aluminum, or plastic) that is approximately one-quarter of an inch wide and one-sixteenth of an inch thick that may be fastened or welded to column 80 when manufactured. The exact size and thickness depends on the material used. Catch 118 extends above attachment plate 85 approximately one-quarter of an inch. The purpose of catch 118 is to lock the leg 18 into a corresponding leg receiver 22. The process for installing leg 18 into receiver 22 will be explained in more detail below.

A plurality of leg receivers 22 are attached to the underside of support assembly 14. Each receiver 22 is attached to either a cross-member 40 or a corner 38 of perimeter frame 30. The exact quantity and locations of receivers 22 and legs 18 may depend on the size and shape of bed frame 10. Each receiver 22 comprises three channels 121 extending downwardly from a receiver mounting plate 124, which is attached to support assembly 14. The channels 121 may be arranged to approximate the size and layout of sides 92 and front edge 100 of the leg attachment plate 85. A channel 121 comprises a ledge 127 spaced downward from mounting plate 124. The distance between ledge 127 and mounting plate 124 may be approximately the same as the thickness of attachment plate 85. Channels 121 are arranged to receive sides 92 and front edge 100 and securely hold attachment plate 85 when sides 92 and front edge 100 are completely seated in channels 121. Because sides 92 are angled, two of the three channels 121 are similarly angled such that attachment plate 85 may be inserted into receiver 22 in one orientation so that catch 118 may be correctly aligned with receiver 22. When seated, the periphery of attachment plate 85 (specifically the periphery near sides 92 and front edge 100) is held securely against ledge 127.

The shape of mounting plate 124 may depend on where receiver 22 is attached to support assembly 14. If receiver 22 is attached to a corner 38, receiver 22 may comprise a generally triangular mounting plate 124*a*. If receiver 22 is attached to a cross-member 40, receiver 22 may comprise a generally rectangular mounting plate 124*b*. Mounting plate 124 also includes a series of corrugations 131 which engage catch 118. The term corrugation as used herein is intended to mean any type of ridge, groove, bump, protrusion, depression or any other type of non-planar structure upon which a catch could press, lodge, wedge, or otherwise get stuck against. The series or patch of corrugations 131 is generally located proximate a centerline 140 of mounting plate 124. Centerline 140 passes halfway between the angled channels 121 on plate 124. However, the same shaped receiver 22 may be used regardless of where it is attached to support assembly 14.

Leg 18 is attached to support assembly 14 by securing it to receiver 22. This is accomplished by sliding leg attachment plate 85 into channels 121 on receiver 22. As indicated, channels 121 are arranged in the same tapered shape as attachment plate 85 ensuring that the plate can only be inserted with catch 118 properly oriented to engage corrugations 131. As attachment plate 85 is inserted into channels 121, catch 118 is on the trailing side of the plate 85. Eventually, catch 118 contacts the receiver mounting plate 124 and deflects downward until the distal end 119 of the catch 118 is even with or just slightly above the attachment plate 85. As catch 118 deflects, its distal end 119 moves from a position proximate the first side 112 of aperture 109 to a position proximate the second side 115 of the aperture. The distal end 119 of catch 18 slides over corrugations 131 until the front edge 100 and sides 92 of attachment plate 85 are fully inserted into channels 121. At this point, the distal end 119 of catch 118 should be pressed against a corrugation 131 (either a groove or a ridge). By wedging against a corrugation 131, distal end 119 of catch 118 acts as a stop to prevent attachment plate 85 from backing out of channels 121. The leg 18 is now installed and locked in receiver 22.

Typically, the manufacturer assembles all parts of bed frame 10 prior to shipping, with the exception of attaching legs 18. Therefore, when an installer or end-user receives bed frame 10 from the manufacturer, the support assembly 14 is fully assembled and has the leg receivers 22 attached to it. Because the support assembly 14 with receivers 22 is a generally planar piece, packaging and shipping frame 10 is relatively easy. Legs 18 can be laid flat against support assembly 14 to help minimize the space occupied by bed frame 10 during shipment. When bed frame 10 is received by an installer or end-user, assembly is as easy as resting the pre-assembled support assembly 14 upside down on the floor with the leg receivers 22 in an accessible position and then locking all of the legs 18 in the receivers 22 as described above. The bed frame 10 can then be turned over and placed with legs 18 on the floor and it is ready to use.

The invention provides a strong, durable, and relatively lightweight bed frame 10, which can be quickly and easily assembled by an installer or end-user. Because the legs 18 are the only thing that needs to be assembled by an installer or end-user, installation time is very short and installation is done without a need for tools. Bed frame 10 can be installed in a fraction of the time of a conventional bed frame (which would require assembly of multiple parts and involve hardware and tools). This can result in a significant savings in installation costs when, for example, multiple new beds are furnished in a newly built hotel.

It should be understood that while certain forms and embodiments have been illustrated and described herein, the present invention is not to be limited to the specific forms or arrangement of parts described and shown, and that the various features described may be combined in ways other than those specifically described without departing from the scope of the present invention.

For example, while the exemplary embodiment described includes tubular components, the present invention equally applies to embodiments having non-tubular components and components having "L" or "C" shaped cross-sections.

The terms "substantially," "generally," "approximately," or any other qualifying term as used herein may be applied to modify any quantitative representation, which could permissibly vary without resulting in a change to the basic function to which it is related.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A bed frame comprising:
    a perimeter frame having four sides arranged in a generally rectangular configuration and defining a generally rectangular area;
    a cross-member routed from a first of said four sides to a second of said four sides wherein said first and second sides are parallel, said cross-member attached to said first and second sides;
    a vertical support comprising a column and a plate attached to a first end of said column, said plate having two sides extending from a back edge of said plate to a front edge of said plate, said vertical support further comprising a catch extending above said plate; and
    a receiver for said vertical support, said receiver having two channels to receive said sides of said plate, said receiver further comprising a corrugation which said catch presses against to secure said sides of said plate in said two channels.

2. The bed frame of claim 1, further comprising a third channel to receive said front edge of said plate.

3. The bed frame of claim 2, wherein said two sides of said plate converge as they extend from said back edge to said front edge.

4. The bed frame of claim 3, wherein said catch is attached to said column and extends through an aperture in said plate.

5. The bed frame of claim 4, wherein said catch is bent when it catches on said corrugation.

6. The bed frame of claim 5, wherein said receiver is attached to said cross-member.

7. The bed frame of claim 5, wherein said receiver is attached to said perimeter frame proximate a corner of said perimeter frame.

8. A bed frame comprising:
    a perimeter frame having four sides arranged in a generally rectangular configuration and defining a generally rectangular area;
    a cross-member routed from a first of said four sides to a second of said four sides wherein said first and second sides are parallel, said cross-member attached to said first and second sides;
    a support surface positioned above said cross-member, said support surface having a size and shape that approximates said generally rectangular area defined by said perimeter frame;

a bracket attached to said perimeter frame to help secure said support surface to said perimeter frame, said bracket having a plurality of hooks adapted to engage said support surface;

a vertical support comprising a column and a plate attached to said column, said plate having two sides extending from a back edge of said plate to a front edge of said plate, said vertical support further comprising a catch extending above said plate; and a receiver for said vertical support, said receiver having two channels to receive said sides of said plate, said receiver further comprising a corrugation which said catch presses against to secure said sides of said plate in said two channels.

9. The bed frame of claim 8, wherein a portion of said support surface is covered by at least a portion of said bracket.

10. The bed frame of claim 9, wherein said support surface includes a lattice structure.

11. The bed frame of claim 10, wherein each of said hooks has a notch on a bend and a portion of said lattice structure is positioned in each said notch.

12. The bed frame of claim 11, wherein said two sides of said plate converge as they extend from said back edge to said front edge.

13. The bed frame of claim 12, wherein said catch is attached to said column and extends through an aperture in said plate.

* * * * *